United States Patent Office 3,519,654
Patented July 7, 1970

3,519,654
13β-LOWER ALKYL-Δ⁴,⁹-GONADIENE-3-ONES
Daniel Bertin, Montrouge, André Pierdet, Noisy-le-Sec, Lucien Nedelec, Clichy-sous-Bois, and Jean-Claude Gasc, Bondy, France, assignors to Roussel UCLAF, Paris, France, a corporation of France
No Drawing. Continuation-in-part of application Ser. No. 586,948, Oct. 17, 1966. This application May 13, 1969, Ser. No. 824,321
Claims priority, application France, Oct. 22, 1965, 35,958; Mar. 1, 1966, 51,506; Apr. 19, 1966, 58,177; Apr. 20, 1966, 58,340; June 1, 1966, 63,697; July 12, 1966, 69,128
Int. Cl. C07c *173/00*
U.S. Cl. 260—349          28 Claims

ABSTRACT OF THE DISCLOSURE

Novel 13β-lower alkyl-11-substituted steroids of the formula

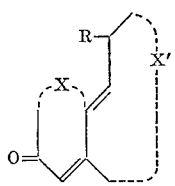

wherein R is selected from the group consisting of lower alkoxy, which may be substituted such as with halogens, hydroxy and cyano, aralkoxy, —SH, lower alkylthio, aralkylthio and azido, X is a residue of the A ring of the steroid molecule which may be substituted and X' is the residue of the B, C and D rings of the steroid molecule which may be substituted which possess interesting physiological properties. Their endocrinic and/or metabolic activities are generally superior to the corresponding 11β-hydroxy steroids. They particularly possess an important hypocholesteroleminant activity as well as an estrogenic activity and an inhibiting activity on hypophysical gonadotrophines.

PRIOR APPLICATION

The present application is a continuation-in-part application of copending, commonly assigned U.S. patent application Ser. No. 586,948, filed Oct. 17, 1966, now abandoned.

OBJECTS OF THE INVENTION

It is an object of the invention to provide the novel 11-substituted steroids of Formula I.

It is another object of the invention to provide novel intermediates for the 11-substituted steroids of Formula I.

It is a further object of the invention to provide novel therapeutic compositions.

It is an additional object of the invention to provide a novel method of treating hypercholesterolemia in warm-blooded animals.

These and other objects and advantages of the invention will become obvious from the following detailed description.

THE INVENTION

The novel 11-substituted steroids of the invention have the formula

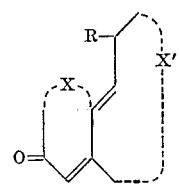

I wherein R is selected from the group consisting of lower alkoxy, which may be substituted such as with hydroxy, halogen and cyano, aralkoxy, —SH, lower alkylthio, aralkylthio and azido, X is the remainder of the A ring of the steroid molecule which may be substituted and X' is the remainder of B, C and D rings of the steroid molecule which may be substituted. The said steroids may be substituted in various positions, such as the 1, 2, 7, 16 and 17-positions such as halogen or methyl in the 1- or 2-position or a methyl in the 16-position.

A preferred group of 11-substituted steroids of the invention are compounds having a gonane nucleus with the A ring having a Δ⁴-3-one grouping and a double bond in the 9(10) position, said nucleus having a lower alkyl radical in the 13β-position and in the 11-position a substituent selected from the group consisting of lower alkoxy, aralkoxy, thiol, lower alkylthio, aralkylthio and azido and the D ring having a substituent in the 17-position selected from the group consisting of

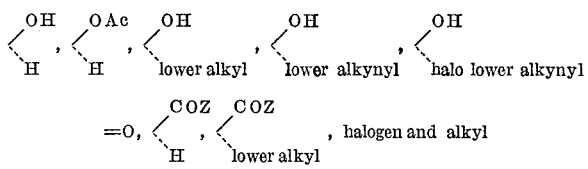

wherein Ac is the acyl of an organic carboxylic acid of 1 to 18 carbon atoms and Z is lower alkyl.

A more preferred group of compounds are those having the formula

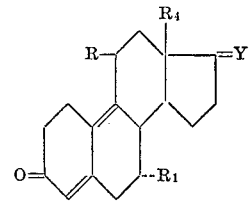

II wherein R has the above definition, R₁ is selected from the group consisting of hydrogen and lower alkyl such as methyl or ethyl, Y is selected from the group consisting of

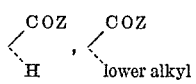

and

Z is lower alkyl of 1 to 7 carbon atoms such as methyl, R₂ is selected from the group consisting of hydrogen, lower alkyl such as methyl, ethyl, isobutyl, lower alkenyl such as allyl, lower alkynyl and halo lower alkynyl such as ethynyl and chloroethynyl, $R_3$ is selected from the group consisting of hydrogen and an acyl of an organic carboxylic of 1 to 18 carbon atoms and $R_4$ is lower alkyl, particularly of 1 to 4 carbon atoms such as methyl, ethyl, propyl, butyl and isobutyl.

The acyl radicals of organic carboxylic acids having from 1 to 18 carbon atoms are those of aliphatic or cycloaliphatic, saturated or unsaturated carboxylic acids or those of aromatic or heterocyclic carboxylic acids. For example, alkanoic acids such as formic acid, acetic acid, propionic acid, butyric acid, isobutyric acid, valeric acid, isovaleric acid, trimethylacetic acid, caproic acid, β-trimethylpropionic acid, oenantic acid, caprylic acid, pelargonic acid, capric acid, undecylic acid, lauric acid, myristic acid, palmitic acid, stearic acid; alkenoic acids such as undecylenic acid, oleic acid; cycloalkanoic acids, such as cyclopentyl, cyclopropyl, cyclobutyl and cyclohexyl carboxylic acids; cycloalkylalkanoic acids, such as cyclopropylmethyl carboxylic acid, cyclobutylmethyl - carboxylic acid; cyclopentylethyl carboxylic acid, cyclohexylethyl carboxylic acid; phenylacetic or propionic acid; benzoic acid; phenoxyalkanoic acids, such as phenoxyacetic acid, p-chlorophenoxyacetic acid, 2,4-dichlorophenoxyacetic acid, 4-terbutylphenoxyacetic acid, 3-phenoxypropionic acid, 4-phenoxybutyric acid; β-ketocarboxylic acids, such as acetylacetic acid, propionylacetic acid, butyrylacetic acid; alkylene polycarboxylic acids, such as succinic acid, adipic acid, citric acid; sulfobenzoic acids, such as m-sulfobenzoic acid, etc.

Among the preferred compounds of the invention are

11β-methoxy-17α-ethynyl-$\Delta^{4,9}$-estradiene-17β-ol-3-one;
11β-ethoxy-17α-ethynyl-$\Delta^{4,9}$-estradiene-17β-ol-3-one;
11β-isopropyloxy-17α-ethynyl-$\Delta^{4,9}$-estradiene-17β-ol-3-one;
11β-benzyloxy-17α-ethynyl-$\Delta^{4,9}$-estradiene-17β-ol-3-one;
11β-methoxy-17α-allyl-$\Delta^{4,9}$-estradiene-17β-ol-3-one;
11β-(β-hydroxyethoxy)-17α-ethynyl-$\Delta^{4,9}$-estradiene 17β-ol-3-one;
11β-methoxy-2,2-dimethyl-17α-ethynyl-$\Delta^{4,9}$-estradiene 17β-ol-3-one;
11β-(2'-cyanoethoxy)-17α-ethynyl-$\Delta^{4,9}$-estradiene-17β-ol-3-one;
11β-(2'-chloroethoxy)-$\Delta^{4,9}$-estradiene-3,17-dione;
11β-methylthio-17α-ethynyl-$\Delta^{4,9}$-estradiene-17β-ol-3-one;
11β-methoxy-$\Delta^{4,9}$-estradiene-17β-ol-3-one;
11β-methoxy-$\Delta^{4,9}$-estradiene-3,17-dione;
11β-methoxy-17α-methyl-$\Delta^{4,9}$-estradiene-17β-ol-3-one;
11β-thiol-17α-ethynyl-$\Delta^{4,9}$-estradiene-17β-ol-3-one;
11β-n-butylthio-17α-ethynyl-$\Delta^{4,9}$-estradiene-17β-ol-3-one;
11β-tert.-butoxy-17α-ethynyl-$\Delta^{4,9}$-estradiene-17β-ol-3-one;
7α-methyl-11β-methoxy-17α-ethynyl-$\Delta^{4,9}$-estradiene-17β-ol-3-one;
7α-methyl-11β-ethoxy-17α-ethynyl-$\Delta^{4,9}$-estradiene-17β-ol-3-one;
7α-methyl-11β-isopropyloxy-17α-ethynyl-$\Delta^{4,9}$-estradiene-17β-ol-3-one;
11βazido-17α-ethynyl-$\Delta^{4,9}$-estradiene-17β-ol-3-one;
7α-methyl-11β-benzyloxy-17α-ethynyl-$\Delta^{4,9}$-estradiene-17β-ol-3-one;
7α-methyl-11β-thiol-17α-ethynyl-$\Delta^{4,9}$-estradiene-17β-ol-3-one;
7α-methyl-11β-methylthio-17α-ethynyl-$\Delta^{4,9}$-estradiene-17β-ol-3-one;
7α-methyl-11β-ethylthio-17α-ethynyl-$\Delta^{4,9}$-estradiene-17β-ol-3-one;
7α-methyl-11β-propylthio-17α-ethynyl-$\Delta^{4,9}$-estradiene-17β-ol-3-one;
7α-methyl-11β-n-butylthio-17α-ethynyl-$\Delta^{4,9}$-estradiene-17β-ol-3-one;
11β-methoxy-13β-ethyl-17α-ethynyl-$\Delta^{4,9}$-gonadiene-17β-ol-3-one;
11β-ethoxy-$\Delta^{4,9}$-estradiene-17β-ol-3-one;
11β-methoxy-19-nor-$\Delta^{4,9}$-pregnadiene-3,20-dione;
11β-methoxy 17α-methyl 19-nor$\Delta^{4,9}$-pregnadiene-3,20-dione;
11β-methoxy 2-fluoro 17α-ethynyl-$\Delta^{4,9}$-estradiene 17β-ol-3-one;
11β-methoxy 2,7α-dimethyl 17α-ethynyl-$\Delta^{4,9}$-estradiene 17β-ol-3-one.

The novel 11-substituted steroids of Formula I can be prepared by the process described in copending, commonly assigned U.S. patent application Ser. No. 587,001, filed on Oct. 17, 1966, now U.S. Pat. No. 3,472,884, which comprises reacting a $\Delta^{4,9}$-gonadiene-11β-ol-3-one of the formula

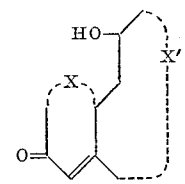

wherein X and X′ have the above definition with a compound selected from the group consisting of an alcohol, a glycol, a mercaptan, an alkali metal azide and hydrogen sulfide in the presence of a strong acid selected from the group consisting of inorganic oxyacids, organic acids and boron trifluoride and its complexes in an aprotic solvent to form the corresponding steroid substituted in the 11-position with an ether, thioether, thiol or azido group.

Examples of suitable strong acids for the process of the invention are inorganic oxyacids such as perchloric acid, sulfuric acid, phosphoric acid, etc.; organic acids such as p-toluene sulfonic acid, etc.; and boron trifluoride and complexes thereof. The use of hydrochloric acid which leads mainly to aromatization of the A ring is avoided. The acid is used in small quantities.

Examples of suitable reactants for the process of the invention are lower alkanols of 1 to 7 carbon atoms, such as methanol, ethanol, isopropanol, propanol, butanol, tert.-butanol, chloro ethanol, cyano ethanol, glycols such as ethylene glycol, etc.; aralkyl alcohols such as benzyl alcohol, β-phenyl-ethanol, etc.; alkyl mercaptans of 1 to 7 carbon atoms such as methyl mercaptan, ethyl mercaptan, propyl mercaptan, n-butyl mercaptan, tert.-butyl mercaptan, etc.; hydrogen sulfide and alkali metal azides such as sodium azide, etc. The said reactants can be used in amounts of 1 to 25 moles of said reactant per mole of the starting 11-hydroxy steroid.

Examples of suitable aprotic solvents for the process are halogenated hydrocarbons, such as methylene chloride, chloroform, carbon tetrachloride, etc.; aliphatic and cycloaliphatic hydrocarbons such as n-hexane, cyclohexane, etc.; aromatic hydrocarbons such as benzene, toluene, etc.; alkyl ethers such as ethyl ether, etc.; cyclic ethers such as dioxane, tetrahydrofuran, etc.; low molecular weight organic carboxylic acid esters such as ethyl acetate, etc.

The reaction is preferably conducted about room temperature although temperatures from 10 to 30° C. may be used. The reaction takes place very rapidly, being practically instantaneous, so that the reaction is completed at the end of a few minutes. The products can be isolated by adding water to the reaction mixture, decanting off the organic phase, and evaporating the organic phase to dryness followed by purification by means such as chromatography.

The novel therapeutic compositions of the invention are comprised of at least one 11-substituted steroid of the formula

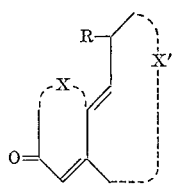

wherein R is selected from the group consisting of lower alkoxy, aralkoxy, —SH, lower alkylthio, aralkylthio and azido, X is the remainder of the A ring of the steroid molecule which may be substituted, and X' is the remainder of B, C and D rings of the steroid molecule which may be substituted, and a major amount of a pharmaceutical carrier. The compositions may be prepared in the form of injectable suspensions or solutions, in ampoules and multidose flacons, in tablets, lozenges, coated pills, sublingual pills, capsules or suppositories.

The said compositions possess an important hypocholestosterolemiant activity as well as an estrogenic activity and an inhibitory activity on hypophysial gonatrophine. Therefore, they can be utilized for the treatment of hypercholesterolemia as well as preventive or curative agents in arterial disorders, in aortitis, in coronary disorders, in cerebral arteritis, in chest angina and atheromatosis and they can be used for the treatment of pathological ailments due to hypoestrogenia or due to an excess of hypophysial hormones due to castration or menopause.

The novel method of the invention for treating hypercholesterolemia in warm-blooded animals comprises administering to warm blooded animals an effective amount of at least one 11-substituted steroid of the formula

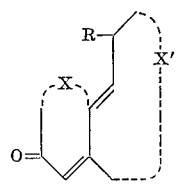

wherein R is selected from the group consisting of lower alkoxy, aralkoxy, —SH, lower alkylthio, aralkylthio and azido, X is the remainder of the A ring of the steroid molecule which may be substituted and X' is the remainder of B, C and D rings of the steroid molecule which may be substituted. The said steroid may be administered orally, perlingually, transcutaneously or rectally.

The usual dose of the compounds for the adult will vary depending upon the specific compound and the method of administration but is usually between 0.01 and 0.3 mg./kg. The daily dose for 11$\beta$-methoxy-17$\alpha$-ethynyl-$\Delta^{4,9}$-estradiene-17$\beta$-ol-3-one, 11$\beta$-ethoxy-17$\alpha$-ethynyl-$\Delta^{4,9}$-estradiene-17$\beta$-ol-3-one, 11$\beta$-methylthio-17$\alpha$-ethynyl-$\Delta^{4,9}$-estradiene-17$\beta$-ol-3-one, 11$\beta$-tert-butyloxy-17$\alpha$-ethynyl-$\Delta^{4,9}$-estradiene-17$\beta$-ol-3-one 11$\beta$-benzyloxy-17$\alpha$-ethynyl-$\Delta^{4,9}$-estradiene-17$\beta$-ol-3-one, 17$\alpha$-ethynyl-$\Delta^{4,9}$-estradiene-17$\beta$-ol-3-one and 11$\beta$-n-butylthio-17$\alpha$-ethynyl-$\Delta^{4,9}$-estradiene-17$\beta$-ol-3-one is between 0.01 and 0.3 mg./kg.

The daily dose for 7$\alpha$-methyl-11$\beta$-methoxy-17$\alpha$-ethynyl-$\Delta^{4,9}$-estradiene-17$\beta$-ol-3-one is between 0.002 to 0.1 mg./kg., for 11-azido-17$\alpha$-ethyl-$\Delta^{4,9}$-estradiene-17$\beta$-ol-3-one is between 0.01 mg./kg. to 0.15 mg./kg.

In the following examples, there are described several preferred embodiments to illustrate the invention. However, it should be understood that the invention is not intended to be limited to the specific embodiments.

EXAMPLE I

Preparation of 11$\beta$-methoxy-17$\alpha$-ethynyl-$\Delta^{4,9}$-estradiene-17$\beta$-ol-3-one 5 gm. of 17$\alpha$ - ethynyl - $\Delta^{4,9}$ - estradiene - 11$\beta$,17$\beta$-diol-3-one were introduced into 250 cc. of methylene chloride containing 3% methanol, and then 1 cc. of 65% perchloric acid was added under vigorous stirring. The agitation was continued for several minutes following the addition after which the reaction mixture was poured into an ice-water mixture. The mixture was decanted and the organic phase was washed with water, filtered and evaporated to dryness under vacuum. The residue obtained was subjected to chromatography through silica gel. The product obtained was purified by dissolution in methylene chloride, treatment with animal black filtration and evaporation to dryness. The residue was crystallized from ether to obtain 2.6 gm. of 11$\beta$-methoxy-17$\alpha$-ethynyl-$\Delta^{4,9}$-estradiene-17$\beta$-ol-3-one having a melting point of 162–163° C. and a specific rotation of $[\alpha]_D^{20} = -93.5°$ (c.=1.1% of methanol).

Ultra-violet spectra in ethanol $\lambda_{max}$. 210 m$\mu$  $E_{1\,cm.}^{1\%} = 167$ $\lambda_{max}$. 233 m$\mu$  $E_{1\,cm.}^{1\%} = 140$ $\lambda_{max}$. 293 m$\mu$  $E_{1\,cm.}^{1\%} = 628$

*Analysis.*—Calculated for $C_{21}H_{26}O_3$ (percent), molecular weight=326.42: C, 77.27; H, 8.03. Found (percent): C, 77.3; H, 8.0.

The product occurred in the form of stable crystalline needles which were insoluble in water and soluble in most of the usual organic solvents.

An identical product was obtained with similar yields when in the said process the methylene chloride was replaced by cyclohexane, benzene, ether, carbon tetrachloride or chloroform.

This compound is not described in the literature.

EXAMPLE II

Preparation of 11$\beta$-ethoxy-17$\alpha$-ethynyl-$\Delta^{4,9}$-estradiene-17$\beta$-ol-3-one 1 gm. of 17$\beta$-ethynyl-$\Delta^{4,9}$-estradiene-11$\beta$,17$\beta$-diol-3-one was dissolved in 50 cc. of chloroform containing 1% ethanol and then 0.2 cc. of 65% perchloric acid was added, and the reaction mixture was agitated for several minutes at room temperature. The reaction mixture was poured into ice water and the organic phase was decanted. The aqueous phase was re-extracted with chloroform, and the organic solutions were combined and washed with water, dried and finally evaporated to dryness. The residue obtained was purified by chromatography through silica gel. Then, the residue was dissolved in hot ethanol, treated with animal black, filtered, condensed to a small volume and iced. After vacuum, filtering and drying, 343 mg. of 11$\beta$-ethoxy-17$\alpha$-ethynyl-$\Delta^{4,9}$-estradiene-17$\beta$-ol-3-one having a melting point of 100–110° C. were obtained.

The product occurred in the form of small colorless rods which were insoluble in water and soluble in ethanol and chloroform.

*Analysis.*—Calculated for $C_{22}H_{28}O_3$ (perecnt), molecular weight=340.44: C, 77.61; H, 8.29. Found (percent): C, 77.4; H, 8.2.

This compound is not described in the literature.

EXAMPLE III

Preparation of 11$\beta$-isopropyloxy-17$\alpha$-ethynyl-$\Delta^{4,9}$-estradiene-17$\beta$-ol-3-one 3 gm. of 17$\alpha$-ethynyl-$\Delta^{4,9}$-estradiene-11$\beta$,17$\beta$-diol-3-one were dissolved in 150 cc. of pure methylene chloride, (free of methanol), and first 1.8 cc. of isopropylic alcohol and then 0.8 cc. of 50% sulfuric acid were added thereto.

The reaction mixture was agitated for 5 minutes and then poured into an ice-water mixture and the product formed was isolated as described in Example I to obtain 1.8 gm. of 11β-isopropyloxy-17α-ethynyl-Δ$^{4,9}$-estradiene-17β-ol-3-one.

This compound is not described in the literature.

EXAMPLE IV

Preparation of 11β-benzyloxy-17α-ethynyl-Δ$^{4,9}$-estradiene-17β-ol-3-one 100 mg. of 17β-ethynyl-Δ$^{4,9}$-estradiene-11β,17β-diol-3-one were placed in suspension in 5 cc. of carbon tetrachloride containing 0.07 cc. of benzyl alcohol. After 0.02 cc. of 65% perchloric acid were added, the suspension was agitated for 2 minutes at room temperature and then poured into an ice-water mixture. The product was isolated as described in Example I to obtain 44 mg. of 11β-benzyloxy-17α-ethynyl-Δ$^{4,9}$-estradiene-17β-ol-3-one having a melting point of 169–170° C.

This compound is not described in the literature.

EXAMPLE V

Preparation of 11β-methoxy-Δ$^{4,9}$-estradiene-17β-ol-3-one 0.5 gm. of Δ$^{4,9}$-estradiene-11β,17β-diol-3-one were dissolved in 25 cc. of methylene chloride containing 2% of methanol and after 0.1 cc. of 65% perchloric acid were added thereto, the mixture was agitated for several minutes at room temperature. Then the reaction mixture was poured into ice water, washed with water until the wash waters were neutral and distilled to dryness under vacuum. The residue was crystallized from ethyl ether to obtain 0.335 gm. of 11β-methoxy-Δ$^{4,9}$-estradiene-17β-ol-3-one, having a melting point of 145° C. The product occurred in the form of colorless needles, which were insoluble in water and dilute aqueous acids and alkalis and soluble in most of the common organic solvents.

This compound is not described in the literature.

In analogous manner. 11β-methoxy-17α-methyl-Δ$^{4,9}$-estradiene-17β-ol-3-one was prepared starting with 17α-methyl-Δ$^{4,9}$-estradiene-11β,17β-diol-3-one.

This compound is not described in the literature.

In an analogous manner as well, 11β-ethoxy-Δ$^{4,9}$-estradiene-17β-ol-3-one (M.P.=128° C.) was prepared starting with Δ$^{4,9}$-estradiene-11β,17β-diol-3-one.

This compound is not described in the literature.

EXAMPLE VI

Preparation of 11β-methoxy-Δ$^{4,9}$-estradiene-3,17-dione

At room temperature, 0.5 gm. of Δ$^{4,9}$-estradiene-11β-ol-3,17-dione was dissolved in 25 cc. of methylene chloride containing 2% of methanol and after 5 mg. of paratoluene sulfonic acid were added, the reaction mixture was agitated for several minutes. Then the reaction mixture was poured into ice water, washed with water until the wash waters were neutral and distilled to dryness under vacuum. The residue obtained was crystallized from ethyl ether to obtain 0.46 gm. of 11β-methoxy-Δ$^{4,9}$-estradiene-3,17-dione having a melting point of 140° C.

The product occurred in the form of prisms which were insoluble in water and in dilute aqueous acids and alkalis and soluble in most of the usual organic solvents.

This compound is not described in the literature.

In an analogous manner, but using ethanol in place of methanol, 11β-ethoxy-Δ$^{4,9}$-estradiene-3,17-dione was prepared starting with Δ$^{4,9}$-estradiene-11β-ol-3,17-dione.

This compound is not described in the literature.

EXAMPLE VII

Preparation of 11β-methylthio-17α-ethynyl-Δ$^{4,9}$-estradiene-17β-ol-3-one 10 gm. of 17α-ethynyl-Δ$^{4,9}$-estradiene-11β,17β-diol-3-one were dissolved in 800 cc. of methylene chloride containing 10 cc. of methyl mercaptan and then 5 cc. of 32% perchloric acid were added thereto. After agitating the mixture for a few minutes at room temperature, an equal volume of water was added. The organic phase was separated, washed with water, dried and brought to dryness under vacuum. The product was purified by chromatography through silica gel to obtain 1.2 gm. of 11β-methylthio-17α-ethynyl-Δ$^{4,9}$-estradiene-17β-ol-3-one which was re-crystallized from isopropyl ether to obtain the product with a melting point of 136° C.

*Analysis.*—Calculated for $C_{21}H_{26}O_2S$ (percent), molecular weight=342.48: C, 73.64; H, 7.65; S, 9.36. Found (percent): C, 73.5; H, 7.6; S, 9.1.

This compound is not described in the literature.

In analogous manner and starting with 17β-benzyloxy-Δ$^{4,9}$-estradiene-11β-ol-3-one; 17α-chloroethynyl-Δ$^{4,9}$-estradiene-11β,17β-diol-3-one; 17α-methyl-Δ$^{4,9}$-estradiene-11β,17β-diol-3-one; and 17α-ethyl-Δ$^{4,9}$-estradiene-11β,17β-diol-3-one the corresponding 11β-methoxy, 11β-ethoxy, 11β-isopropyloxy, 11β-benzyloxy, 11β-methylthio and other derivatives were prepared.

These compounds are not described in the literature.

EXAMPLE VIII

Preparation of 11β-thiol-17α-ethynyl-Δ$^{4,9}$-estradiene-17β-ol-3-one 3 gm. of 17α-ethynyl-Δ$^{4,9}$-estradiene-11β,17β-diol-3-one were dissolved in 30 cc. of methylene chloride containing 1.5 gm. of hydrogen sulfide per 100 cc. of solution. Then 1.5 cc. of 65% perchloric acid were added thereto and the mixture was agitated for 2 minutes at room temperature. The solution was then washed with water, dried and filtered and evaporated to dryness. The raw product was purified by chromatography through silica gel to obtain 0.600 gm. of 11β-thiol-17α-ethynyl-Δ$^{4,9}$-estradiene-17β-ol-3-one which was repeatedly crystallized from isopropyl ether. The product had a melting point of 190° C. and a specific rotation of $[\alpha]_D^{20}=+184.5°$ (c.=0.5% in dioxane).

*Analysis.*—Calculated for $C_{20}H_{24}O_2S$ (percent), molecular weight=328.45: C, 73.12; H, 7.37. Found (percent): C, 73.20; H, 7.4.

This compound is not described in the literature.

EXAMPLE IX

Preparation of 11β-n-butylthio-17α-ethynyl-Δ$^{4,9}$-estradiene-17β-ol-3-one 500 mg. of 17α-ethynyl-Δ$^{4,9}$-estradiene-11β,17β-diol-3-one were dissolved in 50 cc. of methylene chloride and 1.6 cc. of n-butyl mercaptan and 0.25 cc. of 32% perchloric acid were added thereto. The solution was then agitated for 2 minutes at room temperature and then an equal volume of water was added thereto. After the agitation had ceased, the organic phase was decanted, washed with water, dried over sodium sulfate, filtered and evaporated to dryness under vacuum. The dry residue, weighing 667 mg. was purified by chromatography through silica gel to obtain 210 mg. of pure 11β-n-butylthio-17α-ethynyl-Δ$^{4,9}$-estradiene-17β-ol-3-one which upon recrystallization from isopropyl ether had a melting point of 140° C.

This compound is not described in the literature.

In an analogous manner, starting with 17α-ethynyl-Δ$^{4,9}$-estradiene-11β,17β-diol-3-one, 11β-tert.-butyloxy-17α-ethynyl-Δ$^{4,9}$-estradiene-17β-ol-3-one having a melting point of ≈100° C. was prepared.

Ultra-violet spectra (in ethanol)

$\lambda_{max.}$ 231–232 mμ $E_{1 cm.}^{1\%}=134$ 302 mμ $E_{1 cm.}^{1\%}=412$

This compound is not described in the literature.

EXAMPLE X

Preparation of 7α-methyl-11β-methoxy-17α-ethnyl-Δ$^{4,9}$-estradiene-17β-ol-3-one STEP A: PREPARATION OF 3,3-DIMETHOXY-7α-METHYL-17α-ETHYNYL-Δ$^{5(10),9(11)}$-ESTRADIENE-17β-OL 105 cc. of ammonia were cooled to −50° C. and under agitation and a current of inert gas, 1750 gm. of potassium were added thereto, after which a current of acetylene was allowed to bubble through the reaction mixture for 30 minutes. The precipitate was diluted with 28 cc. of ether, then 28 cc. of ether and 7 gm. of 3,3-dimethoxy-7α-methyl-Δ$^{5(10),9(11)}$-estradiene-17-one (prepared according to French Pat. No. 1,456,779) were added while maintaining the temperature at −50° C. and the agitation and the current of inert gas. Then the reaction mixture was agitated for 4 hours at −40° C. while passing a current of acetylene therethrough. Next, 3.5 gm. of ammonium chloride were introduced into the reaction mixture, the temperature was raised to 0° C. and the ammonia was removed. Then, 30 cc. of water were added and the mixture was extracted with methylene chloride. The organic phase was washed with water until the wash waters were neutral, dried, filtered and evaporated to dryness to obtain 7.7 gm. of a raw 17α-ethynyl derivative, which product was purified by chromatography through magnesium silicate and recrystallized from isopropyl ether to obtain 5.2 gm. (69% yield) of 3,3-dimethoxy-7α-methyl-17α-ethynyl-Δ$^{5(10),9(11)}$-estradiene-17β-ol in the form of a solid, colorless product having a melting point of about 130° C. The product was soluble in the usual organic solvents and insoluble in water and in dilute aqueous acids and alkalis.

Infra-red spectra:

Absence of C=O
Presence of OH at 3590 cm.$^{-1}$
Presence of C≡CH at 3300 cm.$^{-1}$
Presence of 2 bands, type C=C; conjugated at 1643 cm.$^{-1}$ and 1612 cm.$^{-1}$ This compound is not described in the literature.

STEP B: PREPARATION OF 7α-METHYL-17α-ETHYNYL-Δ$^{5(10),9(11)}$-ESTRADIENE-17β-OL-3-ONE 6.1 gm. of 3,3 - dimethoxy - 7α - methyl-17α-ethynyl-Δ$^{5(10),9(11)}$-estradiene-17β-ol were placed in suspension in 30 cc. of acetic acid containing 5% water and the solution was agitated for 15 minutes at room temperature under an inert atmosphere. Then 15 cc. of water were added to the solution which was again agitated for 15 minutes. Thereafter, always at room temperature and under inert atmosphere, 300 cc. of a saturated aqueous solution of sodium bicarbonate were slowly added, the solution was iced for 30 minutes and filtered. The precipitate was vacuum filtered and the filtrate was washed with water until the wash waters were neutral and then dried under vacuum to obtain 5.2 gm. of 7α - methyl-17α-ethynyl-Δ$^{5(10),9(11)}$-estradiene-17β-ol-3-one having a melting point of 226° C.

This compound occurred in the form of crystallized colorless needles which were soluble in the usual organic solvents and insoluble in water and in dilute aqueous acids and alkalis.

Ultra-violet spectra (in ethanol)

Inflection towards 237 mμ $E^{1\%}_{1cm.}=610$ $\lambda_{max.}$ at 241–242 mμ $E^{1\%}_{1cm.}=630$ Inflection towards 250 mμ $E^{1\%}_{1cm.}=440$ Inflection towards 290 mμ $E^{1\%}_{1cm.}=4.7$ This spectra characterizes a hetero-annular diene.

Infra-red spectra (in chlofrom):

Presence of OH at 3590 cm.$^{-1}$
Presence of C≡CH at 3300 cm.$^{-1}$
Presence of non-conjugated ketone.

This compound is not described in the literature.

STEP C: PREPARATION OF 7α-METHYL-17α-ETHYNYL-Δ$^{4,9}$-ESTRADIENE-11β,17β-DIOL-3-ONE (1) Hydroperoxidation.—1.2 gm. of 7α-methyl-17α-ethynyl - Δ$^{5(10),9(11)}$ - estradiene -17β-ol-3-one were placed in suspension in 30 cc. of ethanol containing 1% of triethylamine and a stream of oxygen was passed through the solution for 24 hours at room temperature. Then the solution was evaporated to dryness to obtain 1.87 gm. of 7α - methyl-11β-hydroperoxy-17α-ethynyl-Δ$^{4,9}$-estradiene-17β-ol-3-one, which was utilized as such for the next step of the synthesis.

(2) Reduction.—The said 11-hydroperoxide derivative was introduced into 6.5 cc. of ethanol and 0.65 cc. of triethyl phosphite were added thereto. The mixture was agitated for 1 hour at reflux and then brought to room temperature and 1.3 cc. of 30% hydrogen peroxide and 1.3 cc. of distilled water were added. The reaction mixture was again agitated for 1 hour and then 35 cc. of water were added. The reaction mixture was extracted with methylene chloride and the organic phase was washed with water, dried over sodium sulfate and evaporated to dryness. The residue was triturated in hot isopropyl ether, then cooled and filtered. The precipitate obtained was vacuum filtered, washed with water and dried to obtain 0.79 gm. of 7α - methyl-17α-ethynyl-Δ$^{4,9}$-estradiene-11β,17β-diol-3-one in the form of a solid product having a melting point of about 195° C. The product was slightly soluble in the usual organic solvents and insoluble in water and in dilute aqueous acids and alkalis.

Infra-red spectra (in chloroform):

Presence of C≡CH at 3300 cm.$^{-1}$
Presence of conjugated ketone

Ultra-violet spectra (in ethanol)

$\lambda_{max.}$ at 213–214 mμ $E^{1\%}_{1cm.}=149$ $\lambda_{max.}$ at 234 mμ $E^{1\%}_{1cm.}=141$ Inflection towards 239–240 mμ $E^{1\%}_{1cm.}=138$ $\lambda_{max.}$ at 299 mμ $E^{1\%}_{1cm.}=556$ This compound is not described in the literature.

STEP D: PREPARATION OF 7α-METHYL-11β-METHOXY-17α-ETHYNYL-Δ$^{4,9}$-ESTRADIENE-17β-OL-3-ONE 760 mg. of 7α-methyl-17α-ethynyl-Δ$^{4,9}$-estradiene-11β,17β-diol-3-one were dissolved in 38 cc. of methylene chloride containing 0.5% of methanol and 0.16 cc. of 32% perchloric acid. The solution was agitated for 7 minutes, then an ice-water mixture was added and the reaction mixture was made alkaline with triethylamine. The organic phase was washed with water until the wash waters were neutral, dried, filtered and evaporated to dryness. The raw product was subjected to chromatography through magnesium silicate and then recrystallized from ethyl acetate by heating and cooling to obtain 520 mg. of 7α-methyl-11β-methoxy - 17α - ethynyl - Δ$^{4,9}$ - estradiene-17β-ol-3-one, having a melting point of 196° C.

*Analysis.*—Calculated for: $C_{22}H_{28}O_3$ (percent), molecular weight=340.44: C, 77.61; H, 8.29. Found (percent): C, 77.9; H, 8.0.

Infra-red spectra (in chloroform):

Presence of OH at 3590 cm.$^{-1}$
Presence of C≡at 3300 cm.$^{-1}$
Presence of conjugated ketone Ultra-violet spectra (in ethanol)

$\lambda_{max.}$ at 212 mμ $E^{1\%}_{1cm.}=147$ $\lambda_{max.}$ at 240 mμ $E^{1\%}_{1cm.}=139$ $\lambda_{max.}$ at 297–298 mμ $E^{1\%}_{1cm.}=574$ This compound is not described in the literature.

In analogous fashion, but by replacing the methanol with ethanol and with isopropanol, 7α-methyl-11β-ethoxy-17α - ethynyl-$\Delta^{4,9}$-estradiene-17β-ol-3-one and 7α-methyl-11β - isopropoxy-17α-ethynyl-$\Delta^{4,9}$-estradiene-17β-ol-3-one, respectively were obtained.

These products are not described in the literature.

EXAMPLE XI

Preparation of 11β-azido-17α-ethynyl-$\Delta^{4,9}$-estradiene-17β-ol-3-one 2 gm. of 17α-ethynyl-$\Delta^{4,9}$-estradiene-11β,17β-diol-3-one were dissolved in 100 cc. of pure methylene chloride at room temperature. Under an atmosphere of nitrogen, 2 gm. of sodium azide were added and the mixture was agitated for 1 minute, after which 2 cc. of 65% perchloric acid were added and the mixture was again agitated for 3 minutes. The reaction mixture was poured into 200 cc. of an ice-water mixture and the organic phase was separated, washed first with water, then with a solution of sodium bicarbonate and again with water, and finally was distilled to dryness under vacuum. The residue obtained was dissolved in 10 cc. of ether and filtered. The precipitate was vacuum filtered and washed with ether to obtain 1.40 gm. of raw product which was purified by chromatography through magnesium silicate to obtain 11β - azido-17α-ethylnyl-$\Delta^{4,9}$-estradiene-17β-ol-3-one having a melting point of 152° C.

*Analysis.*—Calculated for $C_{20}H_{23}O_2N_3$ (percent), molecular weight 337.40: C, 71.19; H, 6.87; N, 12.45. Found (percent): C, 71.1; H, 7.0; N, 12.4.

Infra-red spectra (in chloroform):

Presence of $N_3$ at 2090 cm.$^{-1}$
Presence of C=O at 1660 cm.$^{-1}$
Presence of C=C at 1612 cm.$^{-1}$
Presence of OH at 3590 cm.$^{-1}$
Presence of C≡CH at 3300 cm.$^{-1}$ Ultra-violet spectra (in ethanol)

$\tau_{max.}$ at 214 mμ $E_{1\,cm.}^{1\%}$=151

Inflection toward 228 mμ $E_{1\,cm.}^{1\%}$=141

$\tau_{max.}$ at 292-293 mμ $E_{1\,cm.}^{1\%}$=581

This compound is not described in the literature.

EXAMPLE XII

Preparation of 7α-methyl-11β-benzyloxy-17α-ethynyl-$\Delta^{4,9}$-estradiene-17β-ol-3-one 5 gm. of 7α-methyl-17α-ethynyl-$\Delta^{4,9}$-estradiene-11β,17β-diol-3-one prepared as described in Example X and 5.2 cc. of benzyl alcohol were introduced into 250 cc. of carbon tetrachloride. 2 cc. of 32% perchloric acid were added and this mixture was agitated several minutes. Then the reaction mixture was diluted with water, the organic phase was separated by decantation, then washed with water, dried over sodium sulfate and finally evaporated to dryness. This raw product was subjected to chromatography through silica gel to obtain 7α-methyl-11β-benzyloxy-17α-ethynyl-$\Delta^{4,9}$-estradiene-17β-ol-3-one.

This product is not described in the literature.

EXAMPLE XIII

Preparation of 7α-methyl-11β-thiol-17α-ethynyl-$\Delta^{4,9}$-estradiene-17β-ol-3-one 4 gm. of 7α-methyl-17α-ethynyl-$\Delta^{4,9}$-estradiene-11β,17β-diol-3-one, prepared as described in Example X, were introduced into 40 cc. of methylene chloride containing 0.60 gm. of hydrogen sulfide and 2 cc. of 65% perchloric acid were added thereto. The mixture was agitated for a few minutes at room temperature and after dilution with water, the organic phase was separated by decantation, washed with water, dried and concentrated to dryness under reduced pressure. The raw product was purified by chromatography through silica gel to obtain 7α - methyl - 11β - thiol - 17α - ethynyl - $\Delta^{4,9}$ - estradiene-17β-ol-3-one.

This product is not described in the literature.

EXAMPLE XIV

Preparation of 7α-methyl-11β-methylthio-17α-ethynyl-$\Delta^{4,9}$-estradiene-17β-ol-3-one 5 gm. of 7α-methyl-17α-ethynyl-$\Delta^{4,9}$-estradiene-11β,17β-diol-3-one prepared as described in Example X, were introduced into 400 cc. of methylene chloride containing 5 cc. of methyl mercaptan and then 2.5 cc. of 32% perchloric acid were added. The mixture was agitated several minutes at room temperature and diluted with water. The organic phase was decanted off, washed with water, dried and concentrated to dryness under reduced pressure. The raw product obtained was purified by chromatography through silica gel to obtain 7α-methyl-11β-methylthio-17α-ethylyl-$\Delta^{4,9}$-estradiene-17β-ol-3-one.

This product is not described in the literature.

In an analogous fashion, by replacing methyl mercaptan with ethyl mercaptan, propyl mercaptan and butyl mercaptan, 7α - methyl - 11β - ethylthio - 17α - ethynyl-$\Delta^{4,9}$ - estradiene - 17β - ol - 3 - one, 7α - methyl - 11β-propylthio-17α-ethynyl-$\Delta^{4,9}$-estradiene - 17β - ol-3-one and 7α - methyl - 11β - butylthio - 17α - ethynyl - $\Delta^{4,9}$ - estradiene-17β-ol-3-one, respectively, were obtained.

These products are not described in the literature.

EXAMPLE XV

Preparation of 11β-methoxy-13β-ethyl-17α-ethynyl-$\Delta^{4,9}$-gonadiene-17β-ol-3-one 0.5 gm. of 13β-ethyl 17α-ethynyl $\Delta^{4,9}$-gonadiene 11β, 17β-diol-3-one were dissolved in 25 cc. of methylene chloride containing 0.15% of methanol. Then 0.1 cc. of 65% perchloric acid were added. The solution was agitated for several minutes at room temperature, then washed with water until the wash waters were neutral and evaporated to dryness in vacuum. The residue was chromatographed through silica gel, then eluted with a mixture benzene ethyl acetate. The product was purified by recrystallization from ether to obtain 0.2 gm. of 11β-methoxy 13β-ethyl 17α-ethynyl $\Delta^{4,9}$-gonadiene 17β-ol-3-one having a melting point of 164° C. and a specific rotation $[\alpha]_D^{20}$=−110°±2° C. (c.=0.58%, methanol).

Ultra-violet spectra (in ethanol)

$\lambda_{max.}$ 231 mμ $E_{1\,cm.}^{1\%}$=137

$\lambda_{max.}$ 295 mμ $E_{1\,cm.}^{1\%}$=573

*Analysis.*—Calculated for $C_{22}H_{28}O_3$ (percent), molecular weight 340.44: C, 77.60; H, 8.29. Found (percent): C, 77.5; H, 8.6., The product which is not described in the laterature was soluble in alcohols, acetone, benzene and chloroform.

The starting product, the 13β-ethyl-17α-ethynyl-$\Delta^{4,9}$-gonadiene-11β,17β-diol-3-one (M.P. 200° C.), which is not described in the literature, may be obtained starting with 13β - ethyl-17α-ethynyl-$\Delta^{5(10),9(11)}$-gonadiene-17β-ol-3-one, described in Belgian Pat. No. 663,534 and using processes described in Belgian Pats. Nos. 649,223 and 649,224, by reacting the oxygen with the 13β-ethyl-17α-ethynyl-$\Delta^{5(10),9(11)}$-gonadiene-17β-ol-3-one to obtain the 11β-hydroperoxy-13β - ethyl - 17α-ethynyl-$\Delta^{4,9}$-gonadiene-17β-ol-3-one which is treated with a reducing agent to give the desired compound.

EXAMPLE XVI

Preparation of 11β-methoxy-19-nor-$\Delta^{4,9}$-pregnadiene-3,20-dione 5 gm. of 19-nor-$\Delta^{4,9}$-pregnadiene-11β-ol-3,20-dione (prepared by the process of French Pat. No. 1,449,609) were dissolved in 250 cc. of methylene chloride containing 0.5% of methanol and 1.03 cc. of 32% perchloric acid were added to the resulting solution. After stirring for 2 minutes at room temperature, the solution was poured into an aqueous solution of 10% triethylamine. The separated organic phase was washed with water, dried over sodium sulfate and evaporated to dryness in vacuo. The 4.85 gm. of raw 11β-methoxy derivative was purified by chromatography over silica gel with elution by a 4:6 mixture of benzene-ethyl acetate and recrystallization from petroleum ether to obtain 1.8 gm. of 11β-methoxy-19-nor-Δ$^{4,9}$-pregnadiene-3,20-dione melting at 84° C.

*Analysis.*—Calculated for $C_{21}H_{28}O_3$ (percent), molecular weight=328.43: C, 76.78; H, 8.59. Found (percent): C, 76.8; H, 8.6.

Ultra-violet spectrum (ethanol)

$\lambda_{max}$. at 231 mμ $E_{1cm}^{1\%}$=143

Inflection towards 235 mμ $E_{1cm}^{1\%}$=142

$\lambda_{max}$. at 295 mμ $E_{1cm}^{1\%}$=602

Infra-red spectrum (chloroform):

Absence of —OH
Presence of C—O—C
Presence of

As far as is known, this compound is not described in the literature.

PHARMACOLOGICAL STUDY (A) Hypocholesterolemiant action on the normal female rat The study was carried out on groups of female rats, having an average body weight of 200 gm. each. The rats were treated daily for a period of 10 days. The serous sterols were determined on the 11th day on the treated animals as well as on the controls. The steroids under study were utilized orally as aqueous suspensions and administered in daily doses of 50γ/kg., 100γ/kg., 200γ/kg., 1 mg./kg., 2 mg./kg. and 5 mg./kg. depending upon the product used. The results are summarized in Table I.

TABLE I

| Groups | Doses Administered | Serous Sterols in gm. % |
|---|---|---|
| Controls | 0 | 0.55 |
| 11β-methoxy-17α-ethynyl-Δ$^{4,9}$-estradiene-17β-ol-3-one | [1] 50 | 0.26 (−53) |
|  | [1] 100 | 0.23 (−58) |
| Controls | 0 | 0.66 |
| 11β-methoxy-17α-ethynyl-Δ$^{4,9}$-estradiene-17β-ol-3-one | [1] 200 | 0.20 (−70) |
| Controls | 0 | 0.69 |
| 11β-ethoxy-17α-ethynyl-Δ$^{4,9}$-estradiene-17β-ol-3-one | [1] 50 | 0.45 (−35) |
|  | [1] 200 | 0.29 (−58) |
| Controls | 0 | 0.76 |
| 1β-methylthio-17α-ethynyl-Δ$^{4,9}$-estradiene 17β-ol-3-one | [2] 2 | 0.37 (−49) |

[1] γ/kg.  [2] mg./kg.

Under the same test conditions, 7α-methyl-11β-methoxy-17α-ethynyl-Δ$^{4,9}$-estradiene-17β-ol - 3 - one caused a decline in sterolemia of 52% at the dose of 50γ/kg., of 65% at the dose of 200γ/kg. and of 71% at the dose of 1 mg./kg.; 11β-azido-17α-ethynyl-Δ$^{4,9}$-estradiene-17β-ol-3-one caused a decline in sterolemia of 21% at the dose of 200γ/kg., of 32% at the dose of 1 mg./kg. and of 52% at the dose of 5 mg./kg. while 11β-thiol-17-α-ethynyl-Δ$^{4,9}$-estradiene-17β-ol-3-one at the dose of 2 mg./kg. caused a decline of sterolemia by 42%.

(B) Determination of the hypophysial inhibitive effect

Couples of 30-day old female rats of the same litter were united parabiotically. One of the united animals was castrated and treated daily over a period of 10 days, starting on the day following the pairing. The animals were sacrificed on the 11th day. The genital organs were removed and weighed. In this experiment, the castrated rats received by oral administration 6.25γ, 12.50γ and 25γ per day of 11β-methoxy-17α-ethynyl-Δ$^{4,9}$-estradiene-17β-ol-3-one, of 11β-ethoxy-17α-ethynyl-Δ$^{4,9}$-estradiene-17β-ol-3-one and of 11β-methylthio-17α-ethynyl-Δ$^{4,9}$-estradiene-17β-ol-3-one, dissolved in olive oil admixed with 5% benzyl alcohol. The test comprised parabiotically united control animals, one castrated animal united parabiotically with an intact animal, and intact control animals not united parabiotically.

The test was effected for comparison with ethynyl nor-testoterone, administered under the same experimental conditions and at daily doses of 12.5γ and 25γ. The results are summarized in Table II.

TABLE II

| Groups | Daily Doses Administered | Castrated Rat Donor, Mg. Uterus | Intact Rat Receiver Mg. Ovaries | Intact Rat Receiver Mg. Uterus |
|---|---|---|---|---|
| Free Controls | 0 |  | 30.90 | 162.48 |
| United Controls | 0 | 43.54 | 119.75 | 162.0 |
| 11β-methoxy-17α-ethynyl-Δ$^{4,9}$-estradiene-17β-ol-3-one | 6.25γ | 125.62 | 44.18 | 193.62 |
|  | 12.50γ | 147.21 | 15.98 | 96.36 |
| Free Controls | 0 |  | 25.66 | 132.08 |
| United Controls | 0 | 34.30 | 131.62 | 132.88 |
| 11β-ethoxy-17α-ethynyl-Δ$^{4,9}$-estradiene-17β-ol-3-one | 6.25γ | 116.92 | 26.48 | 146.66 |
|  | 12.50γ | 118.65 | 13.86 | 66.83 |
|  | 25γ | 131.75 | 19.50 | 135.86 |
| Free Controls | 0 |  | 44.5 | 209.58 |
| United Controls | 0 | 55.20 | 131.90 | 157.50 |
| 11β-methylthio-17α-ethynyl-Δ$^{4,9}$-estradiene-17β-ol-3-one | 6.25γ | 67.20 | 83.60 | 169.67 |
|  | 12.50γ | 118.60 | 77.71 | 151.60 |
|  | 25γ | 121.30 | 32.71 | 63.18 |
| Free Controls | 0 |  | 27.48 | 160.30 |
| United Controls | 0 | 42.72 | 178.34 | 175.52 |
| Ethynyl nortestosterone | 12.50γ | 63.20 | 67.10 | 131.02 |
|  | 25γ | 66.56 | 20.11 | 78.96 |

Table II shows that the three products possess an important hypophysial inhibitive activity. The hypophysial inhibition is complete at a dose of 12.5γ for the 11-methoxyl compound, at a dose of 6.25γ for the 11-ethoxyl compound and at a dose of 25γ for the methylthio compound as well as for ethynyl nortestosterone.

In Table III, the results obtained with 7α-methyl-17α-ethynyl-11β-methoxy-$\Delta^{4,9}$-estradiene-17β-ol-3-one are presented.

TABLE III

| Groups | Daily Doses Administered | Castrated Rat Donor Uterus, mg. | Intact Rat Receiver Ovaries, mg. | Uterus, mg. |
|---|---|---|---|---|
| Free controls | 0 | | 35.66 | 145.96 |
| United controls | 0 | 50.44 | 128.02 | 168.20 |
| 7α-methyl-17α-ethynyl-11β-methoxy-$\Delta^{4,9}$-estradiene-17β-ol-3-one | 1.562γ<br>3.125γ | 126.17<br>150.22 | 18.92<br>33.74 | 62.70<br>113.44 |
| Ethynyl estradiol | 0.195γ<br>0.390γ | 81.27<br>86.93 | 73.67<br>16.25 | 86.15<br>96.68 |

The minimum inhibitive dose of ethynyl estradiol is 0.390γ while all of the doses of 7α-methyl-17α-ethynyl-11β-methoxy-$\Delta^{4,9}$-estradiene-17β-ol-3-one proved to be entirely inhibitory.

In another experiment, 7α-methyl-17α-ethynyl-11β-methoxy-$\Delta^{4,9}$-estradiene-17β-ol-3-one was administered under the same experimental conditions at doses of 0.195γ, 0.390γ and 0.781γ. The results are summarized in Table IV.

TABLE IV

| Groups | Daily Doses Administered | Castrated Rat Donor Uterus, mg. | Intact Rat Receiver Ovaries, mg. | Uterus, mg. |
|---|---|---|---|---|
| Free controls | 0 | | 32.32 | 175.92 |
| Unified controls | 0 | 61.45 | 211.10 | 196.25 |
| 7α-methyl-17α-ethynyl-11β-methoxy-$\Delta^{4,9}$-estradiene-17β-ol-3-one | 0.195γ<br>0.390γ<br>0.781γ | 72.70<br>71.76<br>112.40 | 170.33<br>71.22<br>22.02 | 212.06<br>173.30<br>140.25 |

Table IV shows that this product exerts a complete hypophysoinhibitory action at the dose of 0.781γ. It should be noted that by way of comparison that ethynyl nortestosterone entirely inhibits the hypophysial secretions only at the dose of 25γ. At dose at which the hypophysial inhibition is attained according to the weight of the uterus of the castrated rat, the studied substance on this animal specie already shows a certain estrogenic action.

Table V shows the results obtained with 11β-azido-17α-ethynyl-$\Delta^{4,9}$-estradiene-17β-ol-3-one with the same test.

TABLE V

| Groups | Daily Doses Administered | Castrated Rat Donor Uterus, mg. | Intact Rat Receiver Ovaries, mg. | Uterus, mg. |
|---|---|---|---|---|
| Free controls | 0 | | 24.68 | 131.22 |
| United controls | 0 | 29.26 | 138.86 | 206.78 |
| 11β-azido-17α-ethynyl-$\Delta^{4,9}$-estradiene-17β-ol-3-one | 6.25γ<br>12.50γ<br>25γ | 45.36<br>57.20<br>122.68 | 62.63<br>60.67<br>20.98 | 107.46<br>149.67<br>87.48 |
| Free controls | 0 | | 27.48 | 160.30 |
| United controls | 0 | 42.72 | 178.34 | 175.52 |
| Ethynyl nortestosterone | 12.50γ<br>25γ | 63.20<br>66.56 | 67.10<br>20.11 | 131.02<br>76.96 |

Table V shows that the said product possesses a distinct hypophyso-inhibitive action, which is evidenced at the dose of 6.25γ and which is complete at the dose of 25γ. This activity is as significant as that of ethynyl nortestosterone.

Table VI presents the results obtained with 11β-thiol-17α-ethynyl-$\Delta^{4,9}$-estradiene-17β-ol-3-one in the same test.

TABLE VI

| Groups | Daily Doses Administered | Castrated Rat Donor Uterus, mg. | Intact Rat Receiver Ovaries, mg. | Uterus, mg. |
|---|---|---|---|---|
| Free controls | 0 | | 28.04 | 90.26 |
| United controls | 0 | 35.76 | 152.20 | 171 |
| 11β-thiol-17α-ethynyl-$\Delta^{4,9}$-estradiene-17β-ol-3-one | 6.25γ<br>12.50γ<br>25γ | 51.64<br>57.86<br>92.60 | 95.20<br>40.68<br>25.15 | 131.22<br>90.71<br>107.05 |
| Free controls | 0 | | 27.48 | 160.30 |
| United controls | 0 | 42.72 | 178.34 | 175.52 |
| Ethynyl nortestosterone | 12.50γ<br>25γ | 63.20<br>66.56 | 67.10<br>20.11 | 131.02<br>76.96 |

Table VI shows that the said product exerts a total hypophysial inhibitive action at the dose of 25γ which activity is as significant as that of ethynyl nortestosterone.

(C) Estrogenic activity

The estrogenic activity was determined using the procedure of Rubin (Endocrynology, 1951, vol. 49, p. 429).

Female mice, 19–21 days old, were treated by subcutaneous administration of the test compounds for 3 days. On the 4th day the uterus of each animal was removed, dissected and weighed. The three compounds studied were dissolved in olive oil admixed with 5% benzyl alcohol at a volume of 0.1 cc. The mice received total doses of 10γ, 30γ, 90γ, 270γ, and 810γ within three days. Table VII summarizes the results obtained. By way of comparison, the results obtained with ethynyl estradiol under the same experimental conditions are included therein.

The product at the dose administered had an anti-androgenic activity as indicated by the lower weight of the prostate and seminal vesicules without loss of testicule weight.

(E) Progestomimetic activity

The progestomimetic activity was determined by the Clauberg test using immature rabbits which have been previously sensitized by a daily subcutaneous dose of 10 μg. of benzoate of estradiol for 5 days. The animals were then treated daily for 5 days with 11β-methoxy-19-

TABLE VII

| Total doses distributed over 3 days | Average Weight of Uterus in mg. | | | | | |
|---|---|---|---|---|---|---|
| | 0 | 10γ | 30γ | 90γ | 270γ | 810γ |
| Treatment by Subcutaneous Administration: | | | | | | |
| 11β-methoxy-17α-ethynyl-Δ⁴,⁹-estradiene-17β-ol-3-one | 8.3 | 20.6 | 25.8 | 66.4 | 83.9 | 84.8 |
| 11β-ethoxy-17α-ethynyl-Δ⁴,⁹-estradiene-17β-ol-3-one | 11.5 | 53.6 | 64.7 | 78.7 | 79.7 | 93.3 |
| 11β-methylthio-17α-ethynyl-Δ⁴,⁹-estradiene-17β-ol-3-one | 11.4 | 32.3 | 46.0 | 75.0 | 90.1 | |
| Total doses distributed over 3 days | 0 | 0.03γ | 0.09γ | 0.27γ | | |
| Ethynyl estradiol | 10.2 | 21.3 | 61.8 | 115.4 | | |

In this test, 11β-methoxy-17α-ethynyl-Δ⁴,⁹-estradiene-17β-ol-3-one and 11β-methylthio-17α-ethynyl-Δ⁴,⁹-estradiene-17β-ol-3-one manifest an estrogenic activity about 1000 times weaker than that of ethynyl estradiol. The estrogenic activity of 11β-ethoxy-17α-ethynyl-Δ⁴,⁹-estradiene-17β-ol-3-one is about 1/100 of that of ethynyl estradiol.

Table VIII summarizes the results obtained with 11β-azido-17α-ethyl-Δ⁴,⁹-estradiene - 17β - ol-3 - one in comparison with the results obtained under the same experimental conditions with ethynyl estradiol.

TABLE VIII

| Total doses distributed over 3 days | Average Weight of Uterus in Mg. | | |
|---|---|---|---|
| | 30γ | 90γ | 270γ |
| Treatment by subcutaneous administration: | | | |
| 11β-azido-17α-ethynyl-Δ⁴,⁹-estradiene-17β-ol-3-one | 49.2 | 85.2 | 116.1 |
| Total doses distributed over 3 days | 0.03γ | 0.09γ | 0.27γ |
| Ethynyl estradiol | 21.3 | 61.8 | 115.4 |

The estrogenic activity of 11β-azido-17α-ethynyl-Δ⁴,⁹-estradiene-17β-ol-3-one is about 1/1000 of that of ethynyl estradiol.

Tests conducted with 7α-methyl - 11β - methoxy-17α-ethynyl-Δ⁴,⁹-estradiene-17β-ol-3-one showed an estrogenic action one hundred times weaker than that of ethynyl estradiol.

(D) Anti-androgenic activity

The anti-androgenic activity was determined in rats in puberty weighing about 200 gm. 11β-methoxy-19-nor-Δ¹,⁴-pregnadiene-3,20-dione in an aqueous suspension was administered subcutaneously at a volume of 0.2 cc. at a daily dose of 10 mg. of product. The administrations were effected 12 times over 14 days. On the 15th day, the animals were sacrificed by carotidienic bleeding and the seminal vesicles, the prostate gland and the testicles were recovered. The results are shown in Table IX.

nor-Δ¹,⁴-pregnadiene-3,20-dione in a solution of olive oil containing 5% benzyl alcohol. The said product was administered orally and subcutaneously at a daily dose of 0.5, 1.0 and 2.0 mg. On the sixth day, the animals were sacrificed and the uterus was examined for the lacy endometric proliferation characteristic of progestomimetic activity. The rating was in MacPhail units and the results are in Table X.

TABLE X

| | Daily Dose in mg. | MacPhail Units |
|---|---|---|
| Method of Administration: | | |
| Oral | 0.5 | 0.6 |
| | 1.0 | 0.8 |
| | 2.0 | 1.8 |
| Subcutaneous | 0.5 | 0.5 |
| | 1.0 | 1.0 |
| | 2.0 | 2.0 |

Table X shows that 11β-methoxy-19-nor-Δ¹,⁴-pregnadiene-3,20-dione has a clear progestomimetic activity at a dosage of 2.0 mg.

Various modifications of the compositions and method of the invention may be made without departing from the spirit or scope thereof.

We claim:

1. A 11β-substituted-13β-lower alkyl steroid of the formula

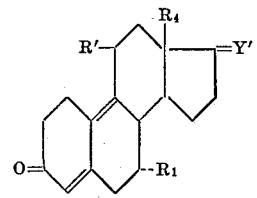

wherein R' is selected from the group consisting of lower alkoxy which may be be substituted with halogen, hydroxy and cyano, aralkoxy, thiol, lower alkylthio, aralkylthio and azido, R₁ is selected from the group consisting

TABLE IX

| | Daily Dose Administered, mg. | Testicles, mg. | Seminal Vesicles, mg. | Prostate, mg. |
|---|---|---|---|---|
| Controls | 0 | 2,560 | 424 | 375 |
| 11β-methoxy-19-nor-Δ¹,⁴-pregnadiene-3,20-dione | 10 | (−8%) | (−63%) | (−53%) | of hydrogen and lower alkyl, $R_4$ is lower alkyl and $Y'$ is selected from the group consisting of

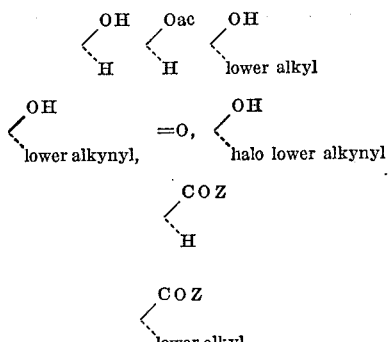

and

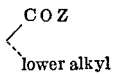

wherein Ac is an acyl of an organic carboxylic acid of 1 to 18 carbon atoms and Z is lower alkyl of 1 to 7 carbon atoms.

2. A compound of claim 1 wherein $R_1$ is hydrogen.

3. A steroid of the formula

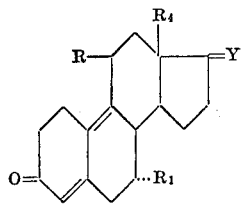

wherein R is selected from the group consisting of lower alkoxy, aralkoxy, —SH, azido and lower alkylthio; $R_1$ is selected from the group consisting of hydrogen and lower alkyl, Y is selected from the group consisting of

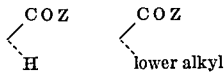

and

Z is lower alkyl, $R_2$ is selected from the group consisting of hydrogen, lower alkyl, lower alkynyl and lower chloroalkynyl and $R_3$ is selected from the group consisting of hydrogen and an acyl radical of an organic carboxylic acid of 1 to 18 carbon atoms, and $R_4$ is lower alkyl.

4. A compound of claim 1 wherein the compound is $11\beta$-methoxy-$17\alpha$-ethynyl-$\Delta^{4,9}$-estradiene-$17\beta$-ol-3-one.

5. A compound of claim 1 wherein the compound is $11\beta$-ethoxy-$17\alpha$-ethynyl-$\Delta^{4,9}$-estradiene-$17\beta$-ol-3-one.

6. A compound of claim 1 wherein the compound is $11\beta$-isopropyloxy-$17\alpha$-ethynyl-$\Delta^{4,9}$-estradiene-$17\beta$-ol-3-one.

7. A compound of claim 1 wherein the compound is $11\beta$-benzyloxy-$17\alpha$-ethynyl-$\Delta^{4,9}$-estradiene-$17\beta$-ol-3-one.

8. A compound of claim 1 wherein the compound is $11\beta$-methylthio-$17\alpha$-ethynyl-$\Delta^{4,9}$-estradiene-$17\beta$-ol-3-one.

9. A compound of claim 1 wherein the compound is $11\beta$-methoxy-$\Delta^{4,9}$-estradiene-$17\beta$-ol-one.

10. A compound of claim 1 wherein the compound is $11\beta$-methylthio-$17\alpha$-ethynyl-$\Delta^{4,9}$-estradiene-$17\beta$-ol-3-one.

11. A compound of claim 1 wherein the compound is $11\beta$-methoxy-$17\alpha$-methyl-$\Delta^{4,9}$-estradiene-$17\beta$-ol-3-one.

12. A compound of claim 1 wherein the compound is $11\beta$-thiol-$17\alpha$-ethynyl-$\Delta^{4,9}$-estradiene-$17\beta$-ol-3-one.

13. A compound of claim 1 wherein the compound is $11\beta$-n-butylthio-$17\alpha$-ethynyl-$\Delta^{4,9}$-estradiene-$17\beta$-ol-3-one.

14. A compound of claim 1 wherein the compound is $11\beta$-tert.-butyloxy-$17\alpha$-ethynyl-$\Delta^{4,9}$-estradiene-$17\beta$-ol-3-one.

15. A compound of claim 1 wherein the compound is $7\alpha$ - methyl - $11\beta$ - methoxy-$17\alpha$-ethynyl-$\Delta^{4,9}$-estradiene-$17\beta$-ol-3-one.

16. A compound of claim 1 wherein the compound is $7\alpha$ - methyl - $11\beta$ - ethoxy-$17\alpha$-ethynyl-$\Delta^{4,9}$-estradiene-$17\beta$-ol-3-one.

17. A compound of claim 1 wherein the compound is $7\alpha$ - methyl - $11\beta$-isopropyloxy-$17\alpha$-ethynyl-$\Delta^{4,9}$-estradiene-$17\beta$-ol-3-one.

18. A compound of claim 1 wherein the compound is $11\beta$-azido-$17\alpha$-ethynyl-$\Delta^{4,9}$-estradiene-$17\beta$-ol-3-one.

19. A compound of claim 1 wherein the compound is $7\alpha$ - methyl - $11\beta$-benzyloxy-$17\alpha$-ethynyl-$\Delta^{4,9}$-estradiene-$17\beta$-ol-3-one.

20. A compound of claim 1 wherein the compound is $7\alpha$ - methyl-$11\beta$-thiol-$17\alpha$-ethynyl-$\Delta^{4,9}$-estradiene-$17\beta$-ol-3-one.

21. A compound of claim 1 wherein the compound is $7\alpha$ - methyl - $11\beta$-methylthio-$17\alpha$-ethynyl-$\Delta^{4,9}$-estradiene-$17\beta$-ol-3-one.

22. A compound of claim 1 wherein the compound is $7\alpha$ - methyl - $11\beta$ - ethylthio-$17\alpha$-ethynyl-$\Delta^{4,9}$-estradiene-$17\beta$-ol-3-one.

23. A compound of claim 1 wherein the compound is $7\alpha$ - methyl - $11\beta$-propylthio-$17\alpha$-ethynyl-$\Delta^{4,9}$-estradiene-$17\beta$-ol-3-one.

24. A compound of claim 1 wherein the compound is $7\alpha$ - methyl - $11\beta$-n-butylthio-$17\alpha$-ethynyl-$\Delta^{4,9}$-estradiene-$17\beta$-ol-3-one.

25. A compound of claim 1 wherein the compound is $11\beta$ - methoxy-$13\beta$-ethyl-$17\alpha$-ethynyl-$\Delta^{4,9}$-gonadiene-$17\beta$-ol-3-one.

26. A compound of claim 1 wherein the compound is $11\beta$-ethoxy-$\Delta^{4,9}$-estradiene-3,17-dione.

27. A compound of claim 1 wherein the compound is $11\beta$-ethoxy-$\Delta^{4,9}$-estradiene-$17\beta$-ol-3-one.

28. A compound of claim 1 wherein the compound is $11\beta$-methoxy-19-nor-$\Delta^{4,9}$-pregnadiene-3,20-dione.

References Cited

UNITED STATES PATENTS

| | | | |
|---|---|---|---|
| 3,211,764 | 10/1965 | Brown et al. | 260—397.45 |
| 3,301,756 | 1/1967 | Joly et al. | 167—65 |
| 3,432,528 | 3/1969 | Anner et al. | 260—397.3 |
| 3,444,297 | 5/1969 | Nomine et al. | 424—243 |
| 3,453,267 | 7/1969 | Vignau et al. | 260—239.55 |

OTHER REFERENCES

Smith et al., Journ. Chem. Soc., November 1964, pp. 4472–4492, p. 4476 pertinent.

LEWIS GOTTS, Primary Examiner

E. G. LOVE, Assistant Examiner

U.S. Cl. X.R.

260—397.3, 397.4, 397.5; 424—242, 243

UNITED STATES PATENT OFFICE
CERTIFICATE OF CORRECTION

Patent No. 3,519,654            Dated July 7, 1970

Inventor(s) Daniel Bertin et al.

It is certified that error appears in the above-identified patent and that said Letters Patent are hereby corrected as shown below:

Column 1, line 44, "hypocholesteroleminant" should read -- hypocholesterolemiant --; line 46, "physical" should read -- physial --. Column 3, line 62, "-" omitted after "11β". Column 6, line 45, "17β", first occurrence, should read -- 17α --. Column 7, line 11, "17β", first occurrence, should read -- 17α --. Column 12, line 56, "laterature" should read -- literature --. Column 17, Table IX, after "11β-methoxy" etc., numerals should appear as follows:

Above "(-8%)"          -- 2335 --
      Above "(-63%)"        --  156 --
      Above "(-53%)",       --  177 --

Signed and sealed this 15th day of December 1970.

(SEAL)
Attest:

EDWARD M. FLETCHER, JR.           WILLIAM E. SCHUYLER, JR.
Attesting Officer                    Commissioner of Patents